April 16, 1940. J. K. BUTLER Re. 21,423
ELECTRIC REFRIGERATOR
Original Filed Oct. 17, 1930 2 Sheets-Sheet 1
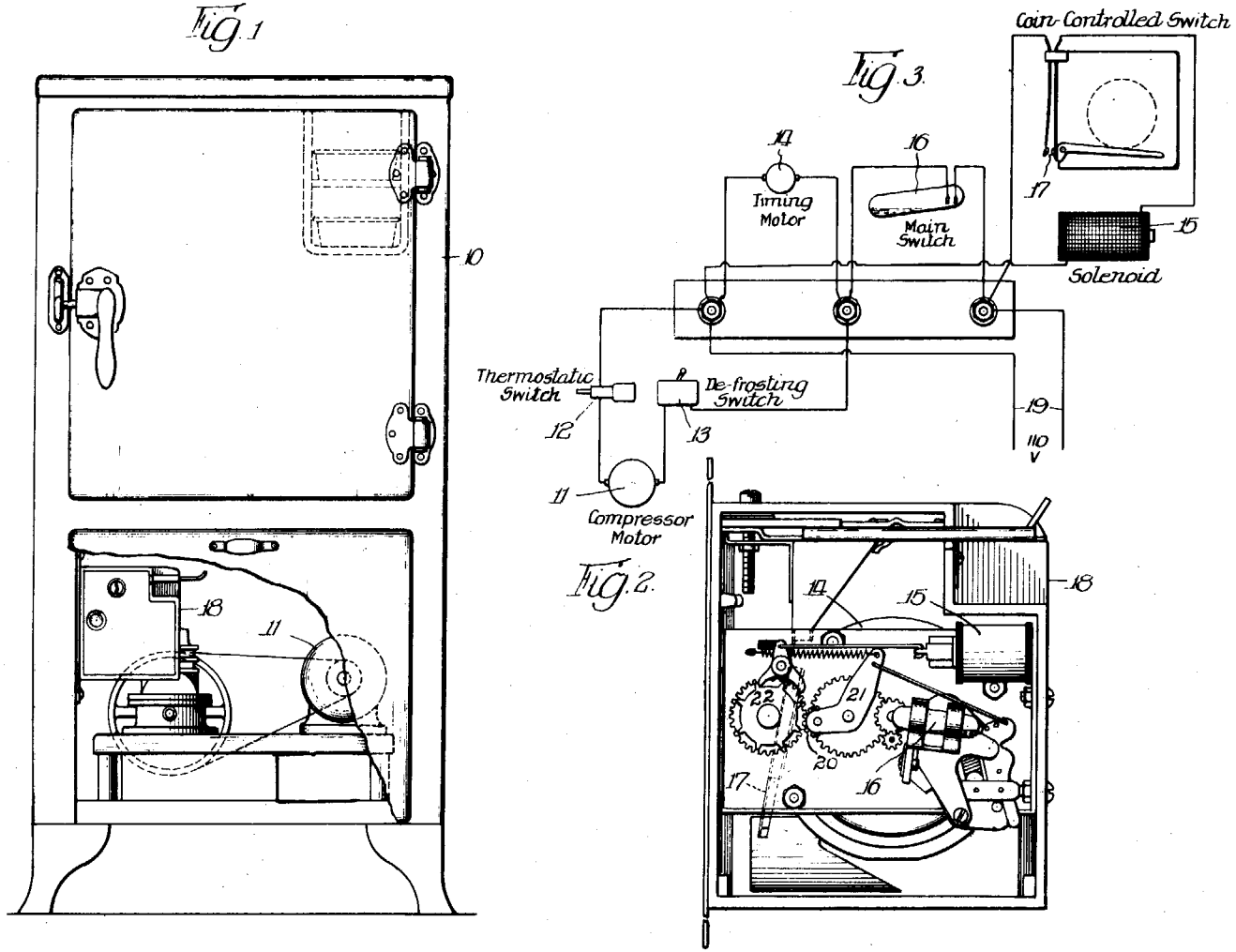
Inventor:
Jack K. Butler,
By Cromwell, Greist & Warden
Attys April 16, 1940. J. K. BUTLER Re. 21,423

ELECTRIC REFRIGERATOR

Original Filed Oct. 17, 1930 2 Sheets-Sheet 2

Inventor

Jack K. Butler,

By Cromwell, Greist & Warden

Attorneys

Reissued Apr. 16, 1940

Re. 21,423

UNITED STATES PATENT OFFICE 21,423

ELECTRIC REFRIGERATOR

Jack K. Butler, Dallas, Tex., assignor, by mesne assignments, to International Register Company, Chicago, Ill., a corporation of Illinois Original No. 1,835,844, dated December 8, 1931, Serial No. 489,283, October 17, 1930. Application for reissue May 6, 1938, Serial No. 206,384

5 Claims. (Cl. 194—9)

The principal object of this invention is to provide an electric refrigerator, which, upon insertion of a coin, will operate, either continuously or at intervals, over a certain period of time.

A further object of the invention is to provide an electric refrigerator having coin controlled means controlling the operating time period for the refrigerator irrespective of the amount of current consumed by the refrigerating unit during the operating period.

Other more specific objects and advantages of the invention will be apparent upon a full understanding of the nature, relationship and purpose of the several novelly cooperating parts of the apparatus.

One form of the invention is presented herein by way of exemplification, but it will of course be appreciated that the invention is susceptible of embodiment in other modified forms coming equally within the scope of the appended claims.

In the accompanying drawings:

Fig. 1 is a front, partially broken away view of an ordinary electric refrigerator equipped with the apparatus of the invention;

Fig. 2 is a front view of an encased unit which contains some of the parts of the apparatus; and Fig. 3 is a schematic illustration of the apparatus, showing the electrical connections between the several parts thereof.

Figure 4:
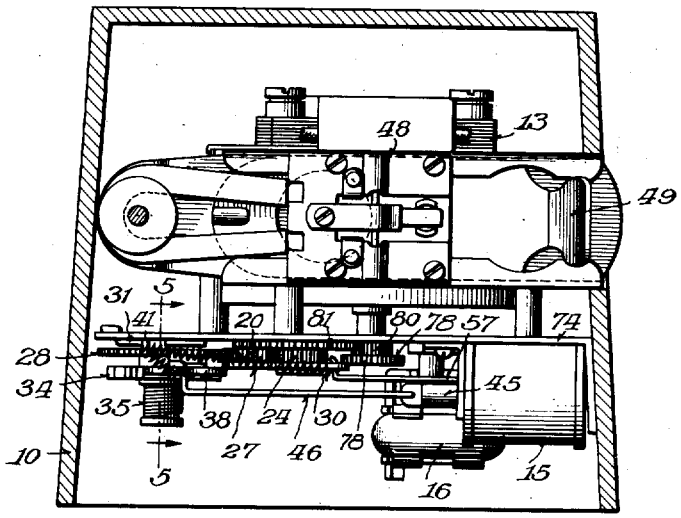
Fig. 4 is a top plan view of the timing mechanism of Fig. 2 with the casing shown in horizontal section.

The apparatus of the invention is adapted to be used with an ordinary electric refrigerator 10 of the single unit type having a compressor, condenser and expansion coil.

The apparatus includes the compressor motor 11 of the refrigerator; the usual thermostatic and de-frosting switches 12 and 13; a timing motor 14; a solenoid 15; a main switch 16 for both motors which is closed by the action of the solenoid and is opened by the action of the timing motor; and a normally open switch 17 for the solenoid which is closed momentarily whenever a coin is inserted in a slot provided for that purpose.

The above named parts 14, 15, 16 and 17 together constitute a coin-controlled timing mechanism 18 which forms the subject matter of a separate application for patent filed by James M. Curless on even date herewith Serial No. 489,287, which has matured into Patent No. 2,054,615, issued September 15, 1936. The parts are embodied in cooperative relation with the refrigerating units in the supply circuit of the refrigerator in the manner disclosed in the schematic illustration of Fig. 3. As illustrated in Fig. 2, a constant speed motor 14 is arranged to drive a reducing gear train having cooperatively associated therewith a planet gear 20 on a pivotally mounted bell-crank lever 21 connected with the tilting main switch 16. An escapement wheel 22 is associated with one of the driven gears of the gear train, and the solenoid 15 energized by the coin control switch 17 when a coin is inserted, is operatively connected with the escapement wheel to set the timing mechanism for time operating periods in accordance with the number of coins successively inserted in the device.

Figure 5:
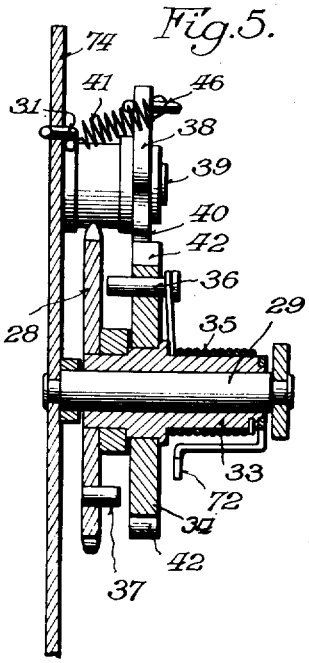
Fig. 5 is an enlarged vertical section through certain parts of the mechanism, taken on the line 5—5 of Fig. 4.
Figure 6:
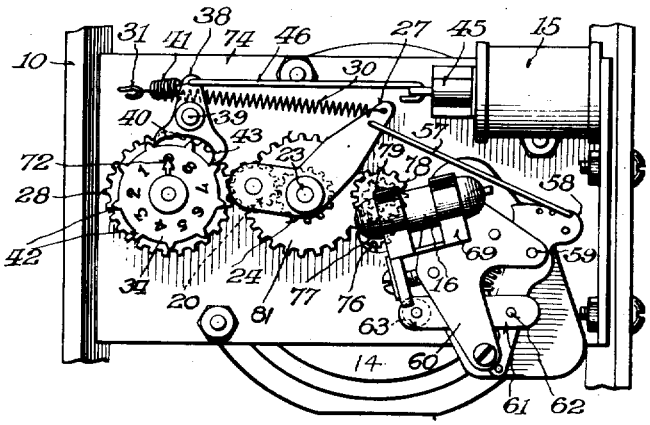
Fig. 6 is an enlarged fragmentary front view of the mechanism corresponding to the central portion of Fig. 2, showing the main switch in open position.

For operation of the particular timing structure selected for purposes of illustration, reference is had to Figs. 4, 5 and 6 of the drawings. The motor 14 is attached to a vertical partition 74 with the armature shaft connected by reduction gearing with a slow speed shaft projecting forwardly through an aperture 76 in the partition where it is provided with a small pinion 77 which meshes on a larger pinion 78. The pinion 78 is journaled on a stub shaft 79 and is provided at its rear face with a small pinion 80 which meshes with a relatively large gear 81.

The gear 81 is journaled on another stub shaft 23 and is provided at its front face with a small pinion 24. The pinion 24 meshes laterally with an arcuately movable planet pinion 20 which is journaled on the outer end of one arm of bell-crank lever 21. The lever 21 is pivotally mounted on the front end of the shaft 23. The planet pinion 20 also meshes laterally with a relatively large gear 28 which is journaled on a rod 29 which projects forwardly from the partition.

The free end of the arm of the bell-crank lever is yieldingly maintained in a downwardly inclined position during the rotation of the motor 14 by a tensioned coil spring 30 which extends from a stationary hook 31 to the free end of the other arm 27 of the bell crank lever. When the motor 14 rotates, the gear 81 rotates very slowly in a clockwise direction, and the gear 28 rotates even more slowly in a clockwise direction, the rotation of the gear 28 being due to the anchorage provided for the planet pinion 20 by the resistance of the spring 30.

The gear 28 is provided with a forwardly projecting sleeve 33 on which an escapement wheel 34 is journaled. The wheel 34 is torsionally connected to the gear 28 by a light coil spring 35 which encompasses the sleeve and is attached at one end to the wheel and at the other end to the sleeve. The wheel 34 is provided on its rear face with a rearwardly projecting stud 36 which is disposed in the path of revolution of a similar stud 37 on the front face of the gear 28. The spring 35 is so arranged as to tend to rotate the wheel in a clockwise direction after the gear 28 has been rotated in a clockwise direction with the wheel held against such movement.

The escapement wheel 34 is normally held against clockwise rotation by an escapement pawl 38 which is pivotally attached to a pin 39. The pawl 38 has a nose 40 which is normally held by a tensioned coil spring 41 in a position behind one of several teeth 42 on the periphery of the wheel. When the pawl 38 is oscillated in a clockwise direction, the nose 40 on the pawl will release from the tooth 42 which it previously engaged, and another nose 43 on the pawl will move into the path of another tooth, whereby to permit the wheel 34 to rotate in a clockwise direction under the action of the spring 35 through a short arc corresponding to the distance between adjoining teeth.

The escapement pawl 38 is oscillated in a clockwise direction by the solenoid 15 connected to the pawl by a link 46. The solenoid is energized to pull on the link 46 whenever a coin, such as a twenty-five cent piece, is caused to close the switch 17. Successively, energizing the solenoid by insertion of several coins will variably increase the operating period of the timing mechanism as energization of the solenoid causes the pawl 38 to permit the wheel 34 to turn in a clockwise direction under the action of the wound spring 35. If desired, several coins may be inserted at the same time one after the other, the wheel 34 turning angularly for each coin inserted.

Before the insertion of the first coin, the stud 37 on the gear 28 will be in a position in abutment with the stud 36 on the wheel 34. After the first coin has been inserted, however, the stud 36 will have been moved by the wheel into a position wherein the gear 28 will have to rotate through one-ninth of a revolution before the stud 37 will abut again with the stud 36. If several coins, for instance four, have been inserted at the same time, the stud 36 will have assumed a position wherein the gear 28 will have to rotate through four-ninths of a revolution before the stud 37 will abut with the stud 36.

As previously stated, the gear 28 rotates very slowly in a clockwise direction when the motor 13 is operating. When the stud 37 on the gear 28 finally comes into engagement with the stud 36 on the wheel 34, the gear 28 will be prevented from rotating any farther, and the planet pinion 25, which is in mesh with the gear 28, will thereupon commence to travel upwardly in an arc. The upward movement of the pinion 26 will of course impart a corresponding oscillation to the bell-crank lever 21, the latter moving from the position shown in Fig. 6.

The bell-crank lever 21 is connected by a link 57 to a throw-over lever 58 which is pivoted at 59 to a stationary bracket 60. An arm 61 is pivoted at 62 to the lower portion of the lever 58 and is provided at one end with a roller 63 adapted to coact with a cam track on the structure to obtain a snap action of the tiltable mercury switch 16 in a conventional manner. The switch 16 includes a glass capsule partly filled with mercury and is supported by spring clips 69.

When the bell-crank lever 21 moves into the position shown in Fig. 6, it will oscillate the throw-over lever 58 in a clockwise direction, causing the roller 63 to ride on the cam surface, thereby tilting the switch 16 into its open position. The switch 16 is in the circuit of the motor 14.

The switch 16 will remain in its open position until another coin is inserted. Upon insertion of another coin, the stud 36 on the wheel 34 will move ahead of the stud 37 out of the way of the latter. The tendency of the thus released gear 28 to rotate under the stored up energy of the spring 35 will move the planet gear 26 downwardly, thereby oscillating the bell-crank lever 21 in a counterclockwise direction, and such movement of the bell-crank lever will cause the throw-over lever 58 to oscillate in a counterclockwise direction, riding the roller 63 on its cam track, resulting in the switch 16 being tilted into its closed position.

It will, of course, be appreciated that the present invention is in no way limited to the above described timing mechanism details, and that such details are included merely for the purpose of exemplification. The particular timing mechanism shown is a separate invention and forms the subject matter of the previously mentioned Curless application.

As shown diagrammatically in Fig. 3, the compressor motor 11 and timing motor 14 are connected in parallel in an electrical circuit 19, and the thermostatic switch 12 and defrosting switch 13 are arranged in the circuit in series with the compressor motor and with each other. The main switch 16 is placed in the circuit in series with the motors, and the solenoid 15 and coin-operated switch 17 are connected in series and arranged in parallel with the main switch and timing motor.

In the inactive condition of the apparatus, wherein neither the motor 11 nor the motor 14 is operating, the switches 12 and 13 are closed and the switches 16 and 17 are open. When a coin, for instance a twenty-five cent piece, is inserted in the switch 17, it will momentarily close the latter, thereby causing the solenoid 15 to be energized. The solenoid 15, which is mechanically connected with the switch 16, will thereupon close the latter, thus completing the circuit 19 through the motors 11 and 14 and starting both of the same. The timing motor 14, like the solenoid 15, is mechanically connected with the switch 16, and, after such motor has been running for a predetermined length of time, it will automatically open the switch, thereby shutting off the current through both motors and returning the apparatus to its inactive condition. During the operation of the timing motor 14, the compressor motor 11 may be independently shut off, either by the automatic operation of the switch 12 or manual operation of the switch 13.

I claim:

1. In electrical refrigeration apparatus, the combination with a compressor motor, of a timing motor, coin controlled means automatically actuated by insertion of a coin for conditioning the circuit for starting both motors at the same time while permitting insertion of a coin without shutting off said compressor motor, means for shutting off both motors at the same time after a predetermined period of time has elapsed, and means for shutting off the compressor motor before the end of such period without shutting off the timing motor.

2. In electrical refrigeration apparatus, an electric circuit, a compressor motor in the circuit, a timing motor in the circuit in parallel with the compressor motor, a main switch in the circuit in series with both motors, a solenoid in the circuit in parallel with the main switch, coin controlled means for causing the timing motor to open the main switch after a predetermined period of time has elapsed, said means comprising timing means and constant driving connections between said timing means and said timing motor effective for continuously driving said timing means without interruption during insertion of a coin when said main switch is closed, means for causing the solenoid to close the main switch when energized, and a coin controlled switch in the circuit in series with the solenoid for energizing the latter to close the main switch and place the apparatus in operation.

3. In electrical refrigeration apparatus, an electrical energy supply circuit, a compressor motor energized from the supply circuit, timing means including a constant speed electric timing motor for controlling the time period of operation of the apparatus, coin actuated means variably controlling the operating period of the timing means in accordance with the number of coins successively employed, and a main switch operatively connected with the timing means for simultaneously controlling operation of the compressor and timing motors, said timing means being continuously driven by said timing motor without interruption during insertion of coins when said main switch is closed.

4. In electrical refrigeration apparatus, an electrical energy supply circuit, a compressor motor energized from the supply circuit, timing means including a constant speed electric timing motor for controlling the time period of operation of the apparatus, coin actuated means variably controlling the operating period of the timing means in accordance with the number of coins successively employed, and a main switch operatively connected with the timing means for simultaneously controlling operation of the compressor and timing motors, said coin actuated means being operable by successively inserted coins without interruption of the operation of either of said motors when said main switch is closed.

5. In electrical refrigerating apparatus, an electrical energy supply circuit, timing means automatically actuated by insertion of a coin and including a constant speed electric motor energized from said circuit for variably controlling the time period of operation of the apparatus in accordance with the number of coins successively inserted, a compressor motor energized from said circuit, a main switch associated with the timing means for controlling simultaneously the electrical energy supply to the compressor and timing motors, said timing means comprising means continuously driven by said timing motor without interruption during insertion of coins when said main switch is closed, and a separate switch for automatically controlling in response to refrigeration requirements operation of the compressor motor independently of the timing means.

JACK K. BUTLER.